(12) United States Patent
Pauly, II et al.

(10) Patent No.: US 11,632,848 B2
(45) Date of Patent: Apr. 18, 2023

(54) INTERCONNECTED REMOTE CONTROL LIGHTING SYSTEM

(71) Applicant: Pauly Enterprises, LLC, Cincinnati, OH (US)

(72) Inventors: Charles D. Pauly, II, Ft. Myers Beach, FL (US); Lawrence Pauly, Cincinnati, OH (US); Evan E. Corbett, Cincinnati, OH (US); David H. Pease, III, Cincinnati, OH (US)

(73) Assignee: Pauly Enterprises, LLC, Cincinnati, OH (US)

( * ) Notice: Subject to any disclaimer, the term of this patent is extended or adjusted under 35 U.S.C. 154(b) by 0 days.

(21) Appl. No.: 16/891,609

(22) Filed: Jun. 3, 2020

(65) Prior Publication Data

US 2020/0383193 A1 Dec. 3, 2020

Related U.S. Application Data

(60) Provisional application No. 62/856,191, filed on Jun. 3, 2019.

(51) Int. Cl.
*H05B 47/195* (2020.01)
*F21V 33/00* (2006.01)
(Continued)

(52) U.S. Cl.
CPC ............ *H05B 47/195* (2020.01); *F21S 8/022* (2013.01); *F21S 9/037* (2013.01); *F21V 23/006* (2013.01);
(Continued)

(58) Field of Classification Search
CPC ...... H05B 47/195; H05B 47/11; H05B 47/16; H05B 45/10; H05B 47/185; H05B 47/19;
(Continued)

(56) References Cited

U.S. PATENT DOCUMENTS

| 5,782,552 A | 7/1998 | Green et al. |
| 6,354,714 B1 | 3/2002 | Rhodes |

(Continued)

FOREIGN PATENT DOCUMENTS

| CN | 104278648 A | 1/2015 | |
| KR | 2011129534 A * | 12/2011 | ............... F21K 9/61 |

(Continued)

*Primary Examiner* — Renan Luque
(74) *Attorney, Agent, or Firm* — Wood Herron & Evans LLP

(57) ABSTRACT

Systems, methods, and computer program products for providing and managing a lighting system. A lighting device of the system is configured to receive an activation signal from a user interface of the lighting device, an external communication device, or another lighting device. In response to receiving the activation signal, and if certain operational conditions are met, the lighting device may activate a light source and transmit another activation signal. Additional lighting devices receiving the activation signal from the first lighting device may also activate their light sources and retransmit the activation signal. Data carried by the activation signals and signals received from one or more sensors in each lighting device may be used by the lighting device to determine whether to activate its light source, and one or more characteristics of the light to be emitted.

25 Claims, 8 Drawing Sheets

(51) Int. Cl.
  *F21V 23/00* (2015.01)
  *F21S 9/03* (2006.01)
  *H05B 47/11* (2020.01)
  *H05B 47/16* (2020.01)
  *F21S 8/02* (2006.01)
  *F21Y 115/10* (2016.01)

(52) U.S. Cl.
  CPC ............ *F21V 33/006* (2013.01); *H05B 47/11* (2020.01); *H05B 47/16* (2020.01); *F21Y 2115/10* (2016.08)

(58) Field of Classification Search
  CPC ...... H05B 45/20; H05B 47/155; H05B 35/00; F21S 9/037; Y02B 20/40; H04L 12/2827; H04L 12/2823; H04W 4/80; H04W 76/14; H04W 84/12; H04W 84/18; H04M 1/72415; F21V 33/006; F21V 23/0485
  See application file for complete search history.

(56) References Cited

U.S. PATENT DOCUMENTS

| | | |
|---|---|---|
| 6,356,031 B1 | 3/2002 | Thagard et al. |
| 7,048,400 B2 | 5/2006 | Murasko et al. |
| 8,203,445 B2 | 6/2012 | Recker et al. |
| 8,491,159 B2 | 7/2013 | Recker et al. |
| 9,066,393 B2 | 6/2015 | Recker et al. |
| 9,074,736 B2 | 7/2015 | Recker et al. |
| 9,655,217 B2 | 5/2017 | Recker et al. |
| 9,702,098 B1 | 7/2017 | King |
| 9,860,965 B2 | 1/2018 | Recker et al. |
| 10,143,053 B1* | 11/2018 | Wilson .................. H05B 47/125 |
| 2004/0226601 A1 | 11/2004 | Banister |
| 2007/0223996 A1 | 9/2007 | Green et al. |
| 2010/0271178 A1* | 10/2010 | Ahmad .................... H04Q 9/00 340/10.1 |
| 2015/0092443 A1* | 4/2015 | Kinoshita ............ G02B 6/0036 362/611 |
| 2016/0037615 A1* | 2/2016 | Davis ..................... H04W 4/80 315/291 |
| 2016/0302281 A1 | 10/2016 | Wassel |
| 2017/0093210 A1 | 3/2017 | Recker et al. |
| 2017/0111981 A1 | 4/2017 | Recker et al. |
| 2017/0238387 A1* | 8/2017 | Dahlen .................. H05B 47/11 315/130 |
| 2017/0248302 A1* | 8/2017 | Reithler ................ E04F 15/105 |
| 2017/0306577 A1 | 10/2017 | Trifan |
| 2018/0049300 A1 | 2/2018 | Recker et al. |
| 2018/0098404 A1* | 4/2018 | Hall ...................... H05B 47/16 |
| 2019/0110351 A1* | 4/2019 | Rossi .................... H05B 47/19 |
| 2019/0230772 A1* | 7/2019 | Reiss .................... H05B 47/19 |

FOREIGN PATENT DOCUMENTS

| | | |
|---|---|---|
| WO | 2016171576 A1 | 10/2016 |
| WO | 2017139740 A1 | 8/2017 |

* cited by examiner

INTERCONNECTED REMOTE CONTROL LIGHTING SYSTEM

CROSS-REFERENCE TO RELATED APPLICATIONS

This application claims the filing benefit of U.S. Application No. 62/856,191, filed on Jun. 3, 2019, and entitled "Interconnected Remote Control Lighting System", the disclosure of which is incorporated by reference herein in its entirety.

FIELD OF THE INVENTION

This invention generally relates to lighting systems and, in particular, to systems, methods, and computer program products for controlling operation of a group of lighting devices.

BACKGROUND OF THE INVENTION

Lighting systems, and in particular outdoor lighting systems, can greatly enhance both the appearance and safety of areas used for nighttime activities. However, planning and installing lighting systems that receive power from a utility and cover large areas can be expensive. These types of systems typically require significant amounts of time and technical expertise to design and install, and require inspections and permits from local authorities before they can be commissioned. Moreover, these systems lack flexibility. Once the system is installed, any changes needed to adjust the distribution of light in the area being lit can require further significant expenditures of time and money.

Thus, there is a need for improved systems, methods, and computer program products that provide lighting systems which are easy to install, operate, and modify.

SUMMARY OF THE INVENTION

In an embodiment of the invention, a system is provided that includes a first lighting device and a second lighting device. Each lighting device includes a processor, memory including program code, and a light source. The program code of the first lighting device, when executed by its processor, causes the first lighting device to receive a first signal, and, in response to receiving the first signal, activate its light source and transmit a second signal. The program code of the second lighting device, when executed by its processor, causes the second lighting device to receive the second signal, and, in response to receiving the second signal, activate its light source.

In another embodiment of the invention, a method is provided. The method includes receiving the first signal at the first lighting device, and in response to receiving the first signal, activating its light source and transmitting the second signal from the first lighting device. The method further includes receiving the second signal at the second lighting device, and, in response to receiving the second signal activating the light source of the second lighting device.

In another embodiment of the invention, a computer program product is provided. The computer program product includes a non-transitory computer-readable storage medium, and program code stored on the non-transitory computer-readable storage medium. The program code is configured so that, when executed by one or more processors, the program code causes the one or more processors to receive the first signal at the first lighting device, and in response to receiving the first signal, activate the light source of the first lighting device and transmit the second signal from the first lighting device. The program code further causes the one or more processors to receive the second signal at the second lighting device, and, in response to receiving the second signal, activate the light source of the second lighting device.

The above summary presents a simplified overview of some embodiments of the invention to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

DETAILED DESCRIPTION OF THE INVENTION

Figure 1:
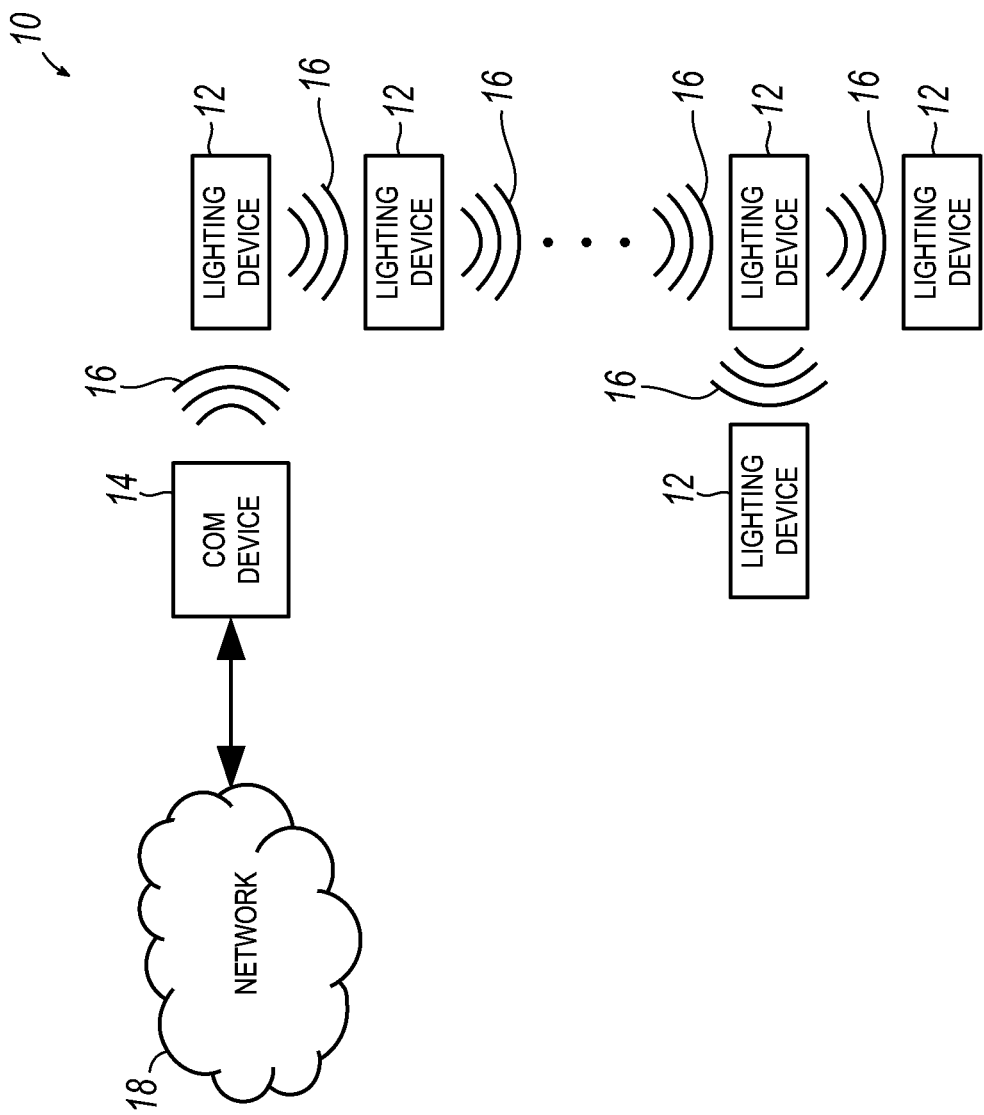
FIG. 1 is a diagrammatic view of a lighting system including a plurality of lighting devices.

FIG. 1 depicts an exemplary lighting system 10 in accordance with an embodiment of the present invention. The lighting system 10 includes a plurality of lighting devices 12 and a communication device 14. Each lighting device 12 may be configured to receive and transmit signals 16 (e.g., wireless signals) that carry data using a suitable communication protocol. Exemplary communication protocols may include, but are not limited to, Bluetooth®, Bluetooth Low Energy (BLE), Radio Frequency Identification (RFID), Near-Field Communication (NFC), Wi-Fi®, Ethernet, Universal Serial Bus (USB), or the like. The lighting devices 12 may be configured to be placed anywhere additional light is desired, such as on the ground along a path.

Data carried by the signals 16 may include one or more identifiers, such as a universally unique identifier (UUID), a medium access control (MAC) address, Internet Protocol (IP) address, or any other suitable identifier that can be used to uniquely identify a lighting device 12 or communication device 14. Identifiers carried by a signal 16 may include one or more of the identifier of the device that originally transmitted the signal 16 (the "originating device"), the identifier of one or more devices through which the signal 16 has passed ("relaying devices"), and the identifier of the device that transmitted the signal 16 being received (the "transmitting device").

The communication device 14 may be a smart phone, tablet computer, desktop computer, network access point, or any other suitable communication device, and may include a system management application. The system management application may enable a user to control the lighting devices 12 by transmitting and receiving signals 16. The system management application may be downloaded to the communication device 14, for example, from a digital distribution platform, such as a manufacturer website or online vendor, such as the APP STORE®, which is a digital distribution platform for computer software operated by Apple Inc. of Cupertino Calif. The communication device 14 may also communicate with a network 18 (e.g., a service provider network), and may transmit signals 16 in response to messages received through the network 18. The communication device 14 may thereby enable users to configure and control the lighting system 10 remotely, e.g., over the Internet.

The system management application may control the lighting devices 12 in different ways depending on input from the user. For example, in response to the user activating an "all lights on" feature, the system management application may broadcast a signal 16 that activates all lighting devices 12 the communication device 14 is authorized to activate and that are within range of the communication device 14. In response to receiving this signal 16, a lighting device 12 may activate a light source that causes the lighting device 12 to emit light. The lighting device 12 may also rebroadcast the signal 16. Rebroadcasting the signal 16 may enable other lighting devices 12 of lighting system 10 to be activated that are out of range of the signal 16 transmitted by the communication device 14, but within range of the lighting device 12 rebroadcasting the signal 16. The rebroadcast signal 16 may carry all or part of the data carried by the received signal 16, and may also carry additional data added by the lighting device 12, such as the identifier of the transmitting lighting device 12.

Each lighting device 12 may also be activated directly by the user, e.g., by the user stepping on or otherwise interacting with the lighting device 12. In response to being directly activated, the lighting device 12 may transmit a signal 16 that activates nearby lighting devices 12 in a similar manner as described above. This activation signal 16 may propagate through the plurality of lighting devices 12 until all the lighting devices 12 in a defined group of lighting devices 12 are illuminated. Other exemplary features that may be provided by the system management application include a time-on duration, light/dark threshold, color, intensity, alert, and bond device features.

The time-on feature may enable the user to set a duration that the lighting device 12 remains illuminated after being activated, either by an activation signal 16 or directly by a user. This duration may be set in the lighting device 12 itself (e.g., by the user during a set-up process), or may be set by data contained in the activation signal 16, in which case the duration could be varied each time the lighting device 12 is activated by an activation signal 16.

The light/dark threshold feature may enable lighting devices 12 to ignore activation signals during periods when the ambient light is above a threshold light level. This feature may enable the lighting devices 12 to conserve power during daylight or twilight hours. This feature may also enable the user to adjust the level of ambient light above which the lighting device 12 ignores activation signals. The user may thereby determine how dark it should be before the lighting device 12 switches on in response to being activated.

The color feature may enable the user to select a spectral content or color of light that is emitted by the lighting device 12. The color may be selected, for example, by the user entering a correlated color temperature (CCT), selecting a color from a chromaticity chart, or any other suitable interaction with a user interface of the communication device 14. The color may be set individually for each lighting device 12 (e.g., by setting a parameter in a memory of the lighting device 12 that controls the light output by the device), or may be selected for all lighting devices 12 (e.g., by including a color parameter in the activation signal 16 that controls the light output by the lighting device 12 or resets the stored color parameter at the lighting device 12).

The intensity feature may operate in a similar manner as the color feature by setting a parameter that controls the intensity of the lighting device 12. The intensity parameter may be stored in the lighting device 12 or be encoded in the activation signal 16. The intensity may be set to an absolute value (e.g., 800 lumens), or a relative level that varies with the ambient light level to optimize light output to the ambient conditions.

Activation of the alert feature may cause all lighting devices 12 receiving the activation signal 16 to illuminate themselves immediately. The lighting devices 12 may also begin flashing in a predetermined, customizable alert color and intensity. Lighting devices 12 receiving an alert signal may also forward this signal to other lighting devices 12. The alert feature may thereby allow users to capture the attention of others in the event of an emergency.

The bonding feature may enable the user to configure the lighting device 12 so that it only responds to signals 16 from other lighting devices 12 or communication devices 14 to which it is bonded. The bonding feature may prevent lighting devices 12 from responding to signals 16 from unrecognized devices, such as a communication device 14 or lighting device 12 of a neighboring lighting system 10. Bonding may be accomplished using a pairing process. This pairing process may be initiated by a request from a user to generate a bond (e.g., by scanning for and requesting a lighting device 12 be bonded to the communication device 14), or may be triggered automatically when the user provides an input to a lighting device 12 indicating that a nearby device is transmitting a bonding signal.

In response to being bonded with another device, the bonded lighting device 12 may begin responding to signals 16 transmitted from that device. The bonding feature may enable the user to configure lighting devices 12 so that they only respond to signals 16 transmitted from specific devices. In response to receiving a signal 16, a bonded lighting device 12 may attempt to determine the identity of the device originating, relaying, or transmitting the signal 16 by extracting one or more identifiers from received signal 16. The lighting device 12 may compare any identifiers in the signal 16 to identifiers of devices to which it is bonded, and respond to the signal 16 based on the results of the comparison.

How the lighting device 12 responds to receiving a signal 16 from a bonded device may depend at least in part on the identity of the device. For example, the color or intensity of light emitted by the lighting device 12 receiving the signal 16 may vary depending on one or more of the identities of the devices originating, relaying, or transmitting the activation signal 16. The response may also vary depending on the time of day (e.g., activate the light source at a reduced intensity between midnight and 5 AM) or ambient conditions sensed by the lighting device 12 (e.g., only activate light source if the ambient light level is below the threshold light level).

The system management application running on communication device 14 may communicate instructions to any lighting device 12 that is in range and to which the communication device 14 is bonded. The system management application may also communicate to or through other communication devices 14, either directly or over a network. The ability of the system management application to communicate with other communication devices 14 may allow users to control lighting devices 12 over the Internet, for example.

Figure 2:
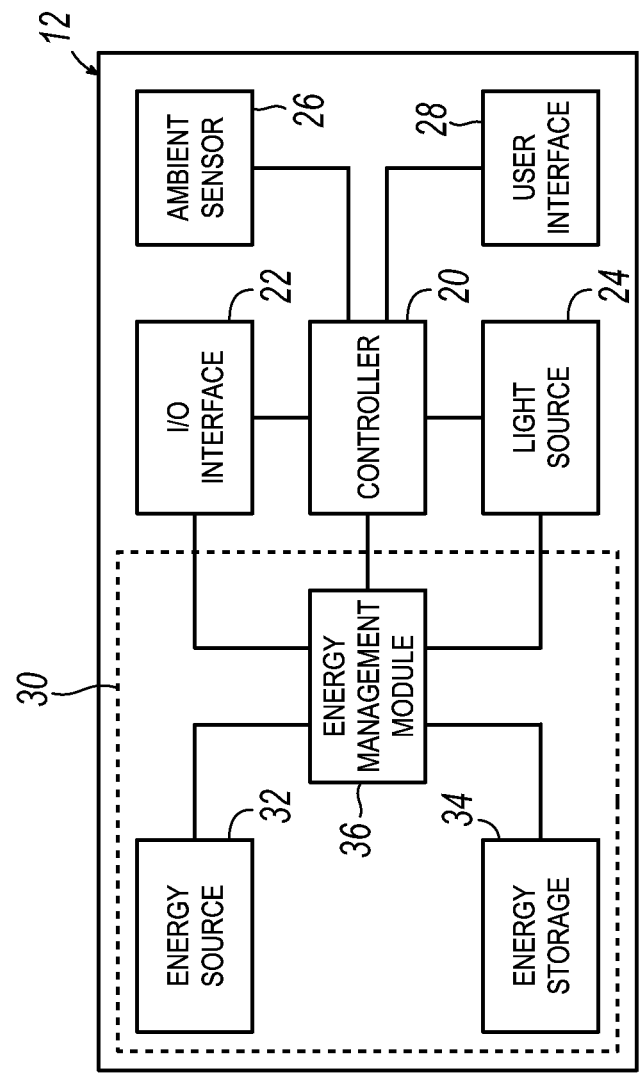
FIG. 2 is a diagrammatic view depicting certain electrical features of an exemplary embodiment of the lighting devices of FIG. 1.

FIG. 2 depicts an exemplary lighting device 12 including a controller 20 in communication with an input/output interface 22, a light source 24, an ambient sensor 26, a user interface 28, and a power supply 30. The power supply 30 may include an energy source 32, an energy storage device 34, and an energy management module 36. The energy source 32 may include an energy harvesting device (e.g., a solar cell or other photovoltaic device), an external source of electrical power (e.g., a connection to an AC adapter or Power over Ethernet), or any other suitable source of energy. For example, the energy source 32 may include a solar panel comprising one or more photovoltaic or photoelectric cells, such as a 6-volt solar panel available from PowerFilm Inc. of Ames Iowa.

The energy storage device 34 may include one or more electrochemical cells, capacitors, or the like, and may be configured to store energy provided by the energy source 32 during times of excess capacity. One suitable energy storage device 34 may include a lithium ion battery having a 3.7 volt output and a 1,200 milliamp hour capacity.

The energy stored in the energy storage device 34 may be used by the lighting device 12 when the energy source 32 is unable to meet demand, e.g., at night in the case of a solar cell-based energy source 32 or during a power outage in the case of an external energy source. The energy management module 36 may manage energy transfer between the energy source 32, energy storage device 34, and the energy consuming components of the lighting device 12, such as the controller 20, I/O interface 22, and light source 24. The energy storage device 34 may be configured to provide all required power to operate the components of the lighting device 12 during periods of time when the energy source 32 is unable to meet the energy demand of the lighting device 12.

The controller 20 of lighting device 12 may be configured to receive and transmit signals 16 through the I/O interface 22 and control the output of the light source 24. The controller 20 may execute embedded program code comprising a controller application that causes the controller 20 to monitor input conditions and take predetermined actions based thereon. The controller application may be implemented as a perpetual event loop that spends most of its time hibernating to conserve electrical power. Whenever a prescribed interval of time passes, the controller application may cause the controller 20 to wake up, power up a transceiver in the I/O interface 22, and check for incoming signals 16 to determine whether any devices within range are broadcasting a signal 16 to which the lighting device 12 should respond.

Control of the light source 24 may be based on signals 16 received from other devices, signals from the ambient sensor 26, signals received from the user interface 28, as well as the operating conditions and control settings of the lighting device 12. To determine operating conditions, the controller 20 may be configured to monitor one or more of the ambient sensor 26, user interface 28, and energy source 32. For example, to determine an ambient light level, the controller 20 may monitor a voltage output by the ambient sensor 26 or (for embodiments using a solar panel) a terminal (e.g., the positive terminal in a negative ground system) of the energy source 32. This voltage may be measured by sampling the voltage across a resistive element, e.g., two 100,000-ohm resistors connected in series between the voltage source and ground. The user interface 28 may include a touch sensor, pressure sensor, switch, proximity sensor, motion sensor, microphone, or other device that generates an internal activation signal when activated by a user, e.g., by stepping on the lighting device 12. The controller 20 may also provide power to and communicate bidirectionally with the transceiver of the I/O interface 22.

The controller 20 may receive a constant voltage (e.g., a three-volt DC voltage) from the energy management module 36, which may have a bidirectional power connection with the energy storage device 34. To charge the energy storage device 34, the energy management module 36 may receive power via one or more conductors (e.g., two conductors) from the energy source 32 and, during times of excess power generation, provide at least a portion of this power to the energy storage device 34. In an embodiment of the invention, the energy management module 36 may include a charge management controller, such as an MCP73811 available from Microchip Technology Inc. of Chandler, Ariz.

The I/O interface 22 of lighting device 12 may include the aforementioned transceiver or other circuitry that enables the controller 20 to transmit and receive signals 16. The I/O interface 22 may thereby enable communication between lighting devices 12 and communication devices 14 within range of each other using wireless signals, e.g., Bluetooth®, BLE, RFID, NFC, or Wi-Fi® signals. The I/O interface 22 may also include a data port (e.g., a serial data port such as an Ethernet or USB port) or other physical connection that enables the lighting device 12 to be connected to other lighting devices 12 or the communication device 14 through a cable. The I/O interface 22 may enable lighting devices 12 to communicate with each other to form an ad-hoc network, and to coordinate responses to signals 16 received from a system management application running on one or more communication devices 14. This communication may further enable the system management application to update the configuration and control operation of each lighting device 12 within the lighting system 10.

Updates to software/firmware may be issued periodically by the system supplier, e.g., when the supplier determines an update is likely to improve operation of the lighting system 10. To initiate an update, the supplier may send a notification to registered users of lighting devices 12. This notification may comprise an electronic message that is transmitted to one or more communication devices 14 associated with the user. The electronic message may be an email, text message, or other suitable communication medium, and may include instructions on how to update the lighting device 12. For example, the instructions may instruct the user to update the lighting device 12 using a boot loader option that loads program code stored in a memory of lighting device 12 in response to rebooting lighting device 12.

The electronic message may include program code embedded as a file in the message, or a link to a location from which the program code can be downloaded. The location from which the program code can be downloaded may be a secure part of a web page provided by the supplier, and may be accessed using a link embedded in the electronic message. Under this scenario, users may open the secure area by clicking on the link in the electronic message, and accept a request to download the program code displayed by the communication device 14 in response to entering the secure area.

The program code may be downloaded directly to the lighting device 12, or through the communication device 14 of the user. For example, the program code may be transmitted to the lighting device 12 using a secure data stream to one or more lighting devices 12 in the lighting system 10, e.g., using a Bluetooth or Wi-Fi signal. In response to receiving the update signal, the lighting device 12 may store the program code in a local memory. The lighting device 12 receiving the update signal may also wake adjacent lighting devices 12 so that they can receive the update signal, either directly or through another lighting device 12 that relays the update signal. For lighting systems 10 that include multiple lighting devices 12 which need to be updated, the update may be performed after all the lighting devices 12 in the lighting system 10 are awake and have received the program code. Updates may be timed to occur when the lighting device 12 is unlikely to be activated, such as when detected ambient light levels are consistent with daylight.

The light source 24 may include one or more electric lights, such as light emitting diodes (LED). For example, the light source 24 may include a plurality of LEDs including one or more LEDs having different output spectrums or intensities. This may enable the controller 20 to control one or more characteristics of the light output by the lighting device 12 (e.g., color, compensated color temperature (CCT), intensity, etc.) by independently adjusting an amount of power provided to each LED of light source 24.

The ambient sensor 26 may provide a signal to the controller 20 indicative of an ambient condition, such as ambient light level, sound level, movement, temperature, or an image or video of an area in view of the lighting device 12. The audio, video, temperature, or other environmental data received from the ambient sensor 26 may be stored locally for later retrieval or transmitted as telemetry embedded in a signal 16. The controller 20 may also use this data to turn the light source 24 on or off or otherwise adjust the characteristics of the light emitted by the light source 24.

For example, the controller 20 may set an intensity or color of the light source 24 based on ambient light levels (e.g., turning off the light in the daytime), motion proximate to the lighting device 12 (e.g., a person approaching the lighting device 12), in response to detecting certain sounds (e.g., breaking glass, a snapping twig, splashing, or a voice command), or temperature (e.g., changing color to indicate whether it is warm or cold out). For embodiments in which the energy source 32 includes a solar panel, the controller 20 may be configured to determine ambient light levels based on the output of the energy source 32, in which case an ambient sensor 26 may be omitted or only configured to provide signals indicative of conditions other than ambient light levels.

In an embodiment of the present invention, the ambient sensor 26 may include a sensing device configured to detect activity associated with a swimming pool. The sensing device may include a transducer configured to detect surface waves, changes in pressure below the surface of the water, acoustic energy, or any other activity that could be indicative of an event occurring in the pool. Events detected may include, for example, something or someone falling into the pool.

The sensing device may be coupled to the lighting device 12 by a tether, and may communicate with the lighting device 12 by transmitting signals to the lighting device 12, e.g., through the tether or wirelessly. The tether may be configured so that, when deployed, the sensing device remains in position on or under the surface of the water proximate to the lighting device 12. The sensing device may be configured to float on top of the water of the pool for surface detection of events or may be configured to sink below the surface of the water for sub-surface detection of events.

Lighting devices 12 that utilize the tethered sensing device may be installed proximate to an edge of the pool, such as near an entry/exit point of the pool where the user desires light. In response to detecting an event, the lighting device 12 may emit light or sound that provides an alarm. This alarm may in turn notify nearby persons that the event has occurred. The lighting device 12 may also transmit wireless signals that, when received by other lighting devices 12 or the communication device 14, cause the lighting devices 12 to emit light or sound that spreads the alarm or the communication device 14 to provide an indication to the user that an event has been detected in the pool. Detection of an event in the pool may thereby cause all the lighting devices 12 in the lighting system, and the communication device 14 of the user, to indicate the occurrence of the event.

The user interface 28 may include a switch or other touch-sensitive device that provides an indication to the controller 20 that someone has activated the lighting device 12, e.g., by stepping on the lighting device 12. The touch-sensitive device may include one or more force sensitive resistors (e.g., two resistors) that are integrated into a top cover plate of the lighting device 12, and may be attached to an exterior base portion of lighting device 12.

The user interface 28 may also include an audio transducer (e.g., a speaker) that enables the lighting device 12 to emit sound. The sound emitted by the lighting device 12 may be indicative of a condition of the device, and may be emitted to provide feedback to users interacting with the lighting device 12. Sound may also be emitted by the lighting device 12 to enable persons to determine a relative location of the lighting device 12.

Sounds may be emitted in response to the lighting device 12 being activated, either by receiving a signal 16 from another lighting device 12 or the communication device 14, or by someone directly activating the lighting device 12. By enabling a person to estimate the position of the lighting device 12 relative to themselves, the sound emitted by the lighting device 12 may enable a person with impaired vision (e.g., due to a physical impairment, low ambient light levels, or because they have been swimming) to follow a path from one lighting device 12 to another by following the sound.

To improve the ability of a person following the sound to distinguish one lighting device 12 from another, the lighting devices 12 may delay relaying a received signal 16, or delay emitting sound based on a number of times the received signal 16 has been previously relayed. This may cause the sounds to be emitted in a sequence that guides the listener down the path defined by the lighting devices 12.

Figure 3:
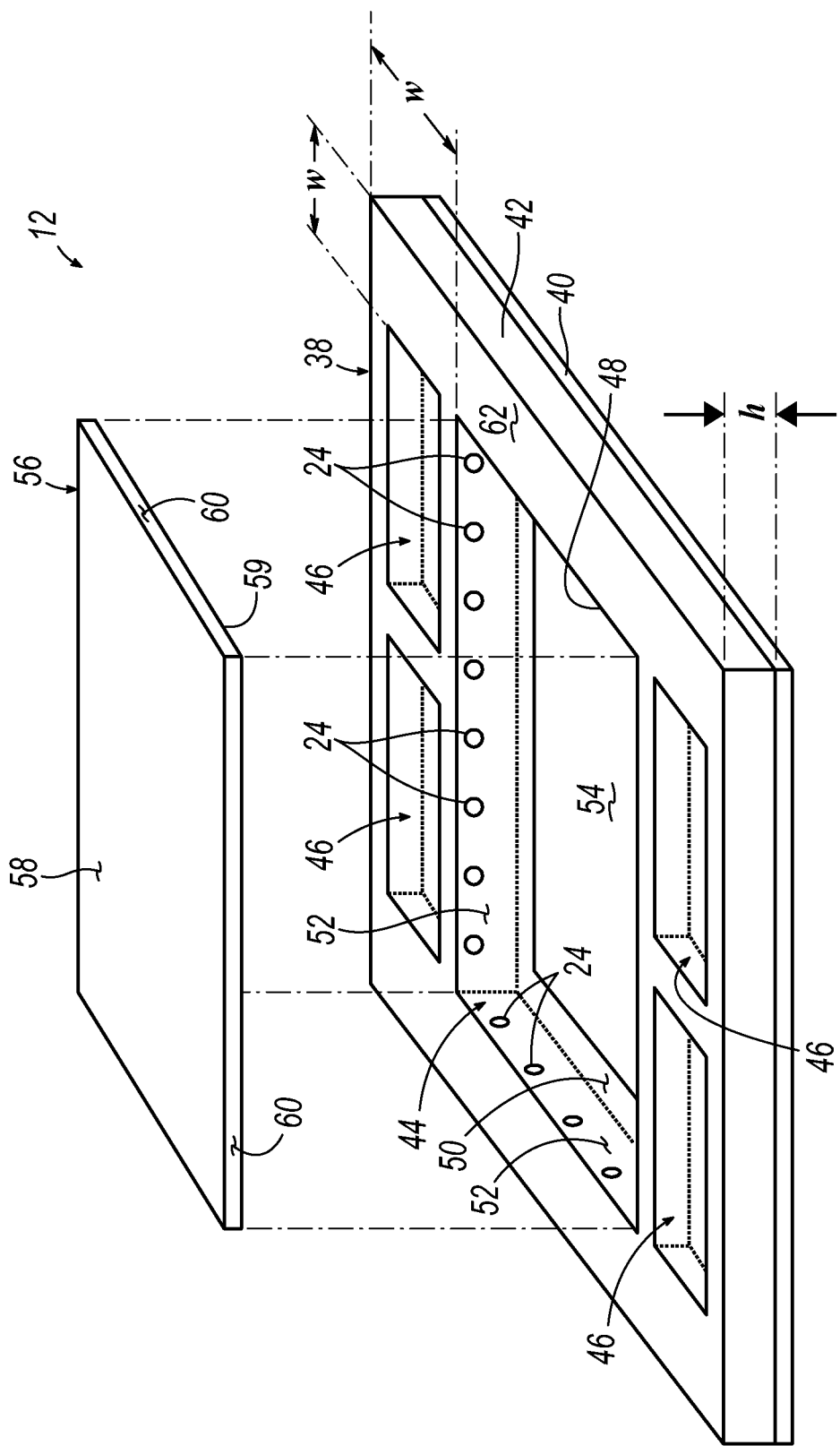
FIG. 3 is an isometric view depicting certain mechanical features of an exemplary embodiment of the lighting devices of FIG. 1.

FIG. 3 depicts an exemplary lighting device 12 in accordance with an embodiment of the present invention. The illustrated lighting device 12 includes a housing 38 having a base 40 and a frame 42. The base 40 and frame 42 may be made from any suitable material or combination of materials. Suitable materials may include plastic (e.g., polyethylene terephthalate (PETG) or acrylonitrile butadiene styrene (ABS)) and metal (e.g., steel or aluminum). The base 40 and frame 42 may define a main compartment 44 and one or more peripheral compartments 46. The frame 42 may provide a rigid structure that resists torsional, compressional, or other deformational forces that could otherwise deform the compartments 44, 46 and damage the components of the lighting device 12.

The main compartment 44 may include an opening 48, a bottom surface 50, and one or more side surfaces 52. A solar panel 54 including one or more photovoltaic or photoelectric cells may be mounted to the bottom surface 50 to provide the energy source 32, and one or more light sources 24 may be embedded in the side surfaces 52. A cover 56 comprising an optically translucent or transparent material having a top surface 58, a bottom surface 59, and side surfaces 60 may be configured to fit over the opening 48 of main compartment 44. When the cover 56 is in place over the opening 48, at least a portion of the light emitted by the light sources 24 may be incident on the side surfaces 60. This light may enter the cover 56 through the side surfaces 60 and be transmitted outward from the top surface 58.

A peripheral portion 62 of the frame 42 may surround the main compartment 44 and extend upward by a height h (e.g., about one centimeter) from the base 40, and may have a width w (e.g., about four centimeters) that extends outward from a perimeter of the opening 48 of main compartment 44. The peripheral compartments 46 may be located in the peripheral portion 62 of frame 42, and may house the energy storage device 34 and one or more printed circuit boards. One or more conduits may connect the peripheral compartments 46 to each other and to the main compartment 44 to provide a path for conductors that connect the various components of the lighting device 12.

By way of example, one peripheral compartment 46 may house the energy storage device 34. The energy storage device 34 may be connected to a main circuit board including the controller 20 in another peripheral compartment 46 by a plurality of conductors, e.g. three conductors. Two of these conductors may supply power to the main circuit board, and one of the conductors may provide a signal from a temperature sensor embedded in the energy storage device 34. This temperature sensor may enable the controller 20 or energy management module 36 to determine if the energy storage device 34 is overheating. The peripheral compartment 46 containing the main circuit board may be located adjacent to the battery compartment.

Figure 4:
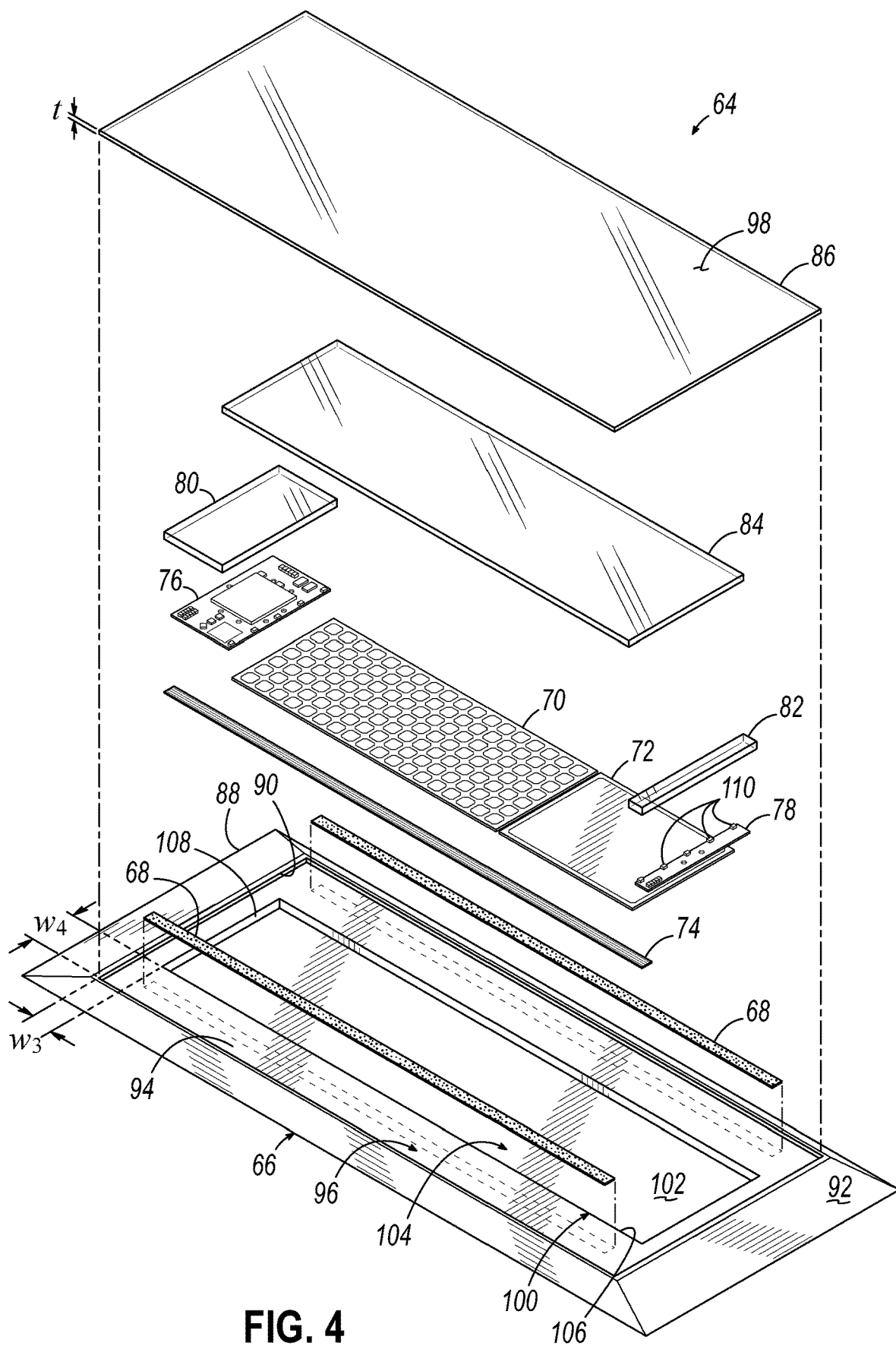
FIG. 4 is an exploded view depicting certain mechanical features of another exemplary embodiment of the lighting devices of FIG. 1.
Figure 5:
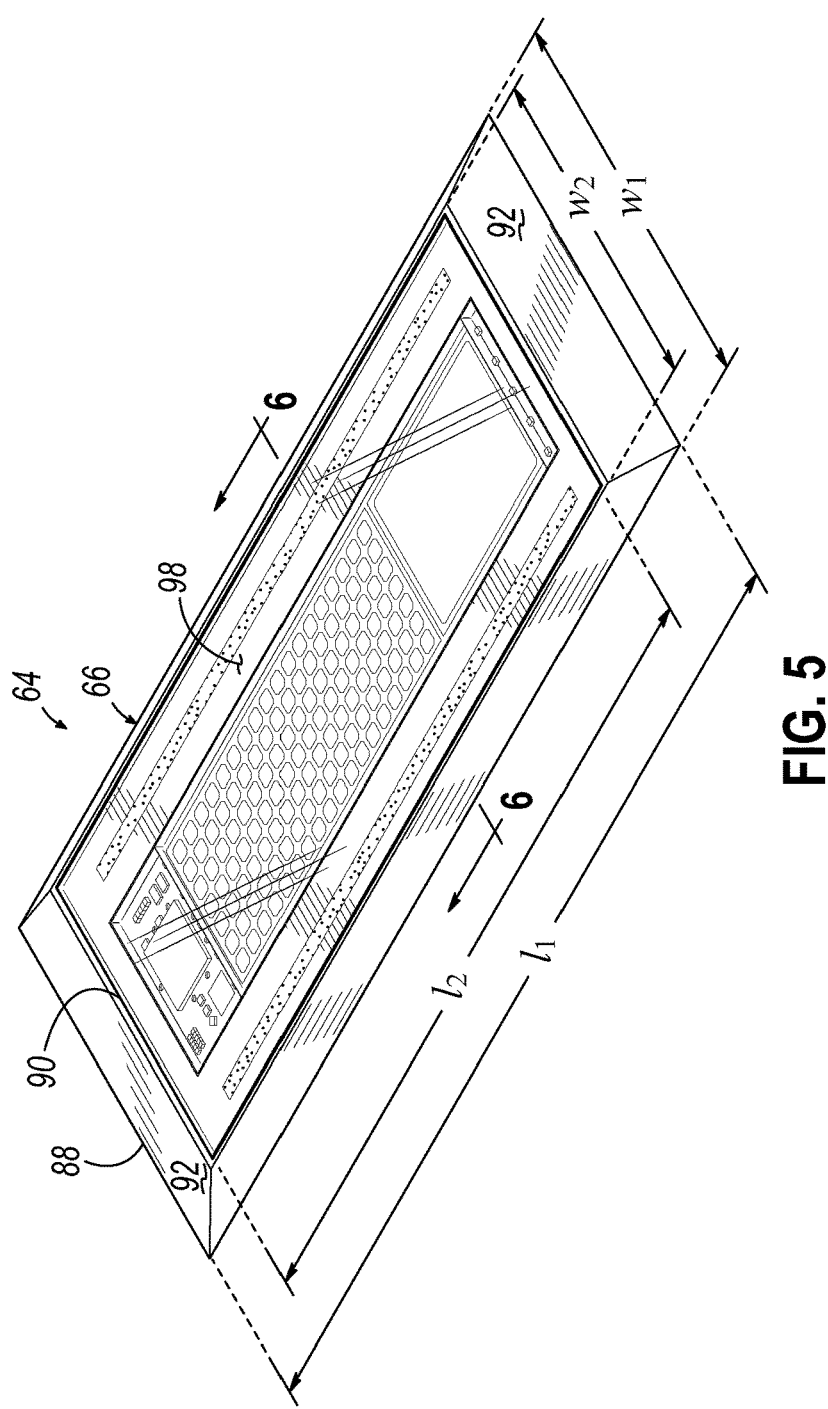
FIG. 5 is an isometric view of the lighting device of FIG. 4.
Figure 6:
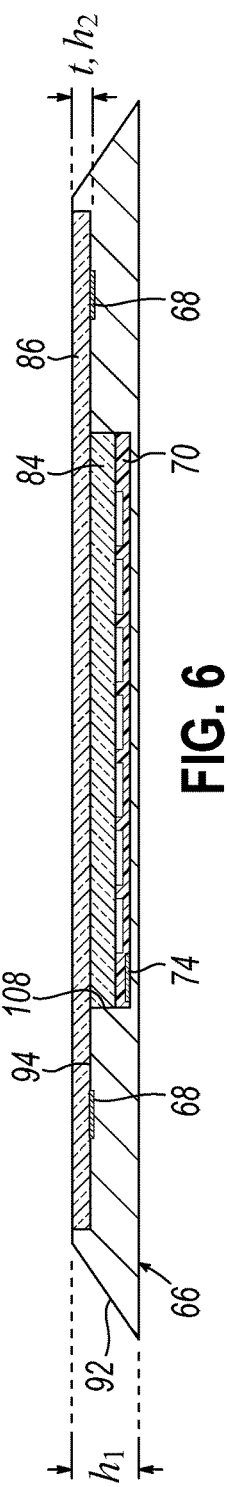
FIG. 6 is a cross-sectional view of the lighting device of FIGS. 4 and 5.

FIGS. 4-6 depict another exemplary lighting device 64 in accordance with an embodiment of the present invention. The illustrated lighting device 64 includes a housing 66, one or more pressure sensors 68, a solar panel 70, a filler panel 72, and a cable 74 including one or more conductors configured to couple a main circuit board 76 to a lighting circuit board 78. The lighting device 64 may also include circuit board covers 80, 82 configured to cover the circuit boards 76, 78, a lens 84 that receives light from the lighting circuit board 78, and a top cover 86.

The housing 66 may include an outer perimeter 88 and an inner perimeter 90. Each of the outer perimeter 88 and inner perimeter 90 may define a polygon (e.g., a rectangle) or closed curve (e.g., a circle or ellipse) shape having dimensions. In the depicted example, the outer perimeter 88 is a rectangular polygon having a length dimension $l_1$ (e.g., about 690 mm) and a width dimension $w_1$ (e.g., about 280 mm), and the inner perimeter 90 is a rectangular polygon having a length dimension $l_2$ (e.g., about 570 mm) and a width dimension $w_2$ (e.g., about 230 mm). The length and width dimensions of the outer perimeter 88 may be larger than those of the inner perimeter 90, and the outer perimeter 88 may be displaced from the inner perimeter 90 by a height dimension $h_1$ (e.g., 13 mm) to define an angled surface 92 that connects the outer perimeter 88 to the inner perimeter 90.

A recessed portion of the housing 66 may define a horizontal ledge 94 that projects inward from the inner perimeter 90 by one or more position dependent width dimensions $w_3$, $w_4$ (e.g., about 20 mm and 50 mm). The ledge 94 may be recessed below the inner perimeter 90 by a height dimension $h_2$ that is about the same as a thickness t of the top cover 86 (e.g., about 4 mm). The pressure sensors 68 may be positioned on the horizontal ledge 94 so that they support the top cover 86 when it is placed in an opening 96 defined by the inner perimeter 90. The top cover 86 may have a top surface 98, and may be made from a transparent or translucent material that transmits light received from the lens 84. The top cover 86 may be configured to transfer pressure applied to its top surface 98 to the pressure sensors 68, such as in response to a person stepping on the top cover 86.

The housing 66 may include another recessed portion that defines a compartment 100 having a bottom surface 102 and an opening 104. The compartment 100 may be positioned so that the opening 104 defines an inner edge 106 of ledge 94, and may be configured to receive the solar panel 70, filler panel 72, cable 74, main circuit board 76, lighting circuit board 78, circuit board covers 80, 82, and lens 84. The solar panel 70 may positioned on or attached to the bottom surface 102 of compartment 100. The solar panel 70 may be located horizontally by one or more sidewalls 108 of compartment 100 and the filler panel 72, and located vertically by the bottom surface 102 of compartment 100 and one or both of circuit board covers 80, 82.

The main circuit board 76 may include all or a portion of the electronic components of the lighting device 64, e.g., the power supply 30, energy source 32, energy storage device 34, energy management module 36, etc. The lighting circuit board 78 may include one or more light sources 110 that are electrically coupled to the main circuit board 76 by the cable 74. The main circuit board 76 may also be electrically coupled to the pressure sensors 68 and solar panel 70. The main circuit board 76 may activate the light sources 110 in response to receiving an activation signal from one or more of the pressure sensors 68, and may store energy received from the solar panel 70 in the energy storage device 34.

Figure 7:
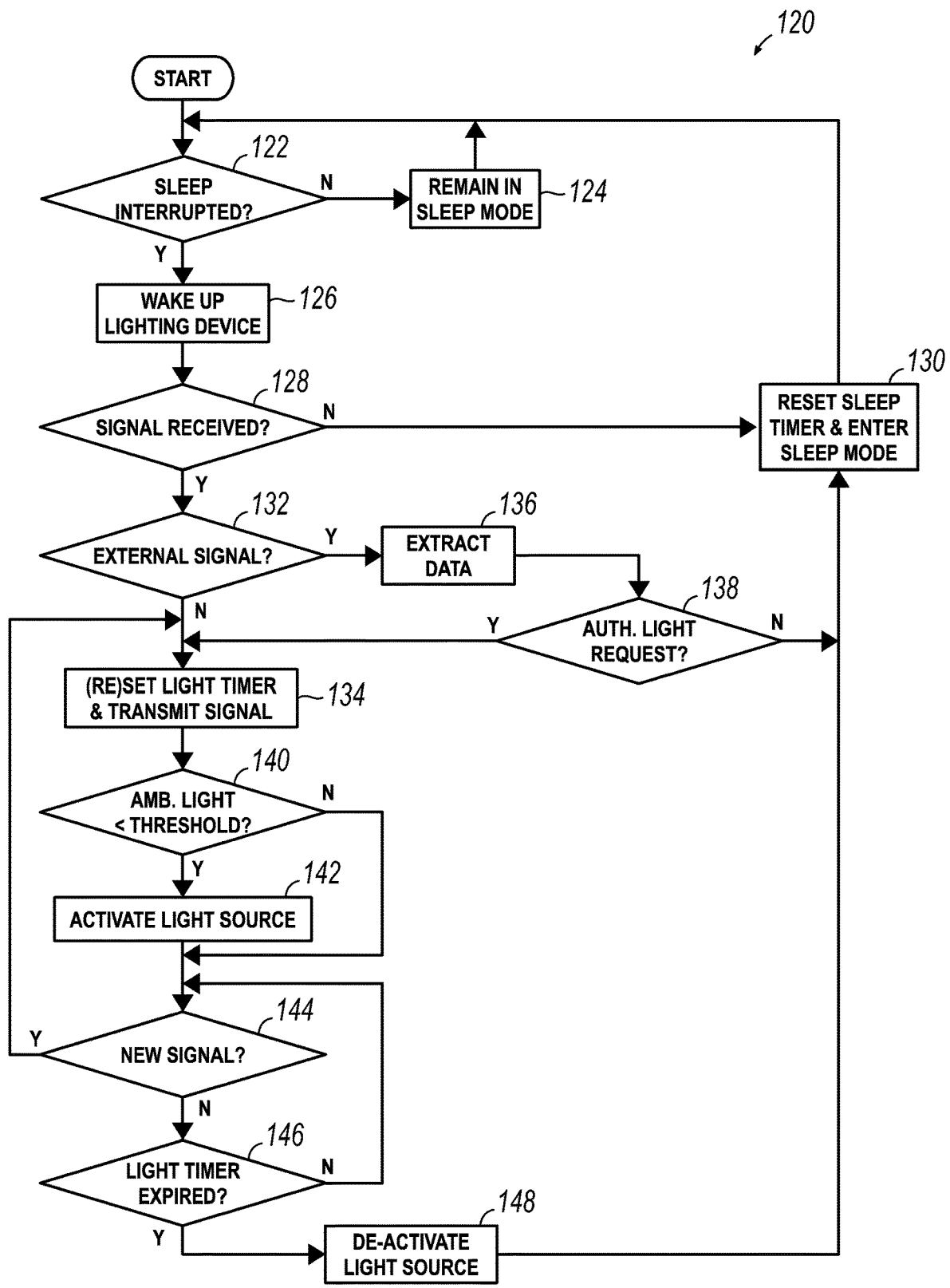
FIG. 7 is a flow chart illustrating a process that may be implemented by the lighting system of FIG. 1.

FIG. 7 depicts a flowchart illustrating a process 120 that may be implemented by the controller 20 of lighting device 12 or any other suitable computing device of lighting system 10. In block 122, the process 120 may determine if a sleep mode has been interrupted, e.g., due to a sleep timer expiring or the occurrence of some other event that interrupts the sleep mode. Exemplary events that could interrupt sleep mode may include receiving a signal indicative of a user activating the lighting device 12 via the user interface 28 (e.g., by stepping on the lighting device 12), or receiving a signal from the ambient sensor 26 or energy source 32 indicating a change in the ambient light level. If the sleep mode has not been interrupted ("NO" branch of decision block 122), the process 120 may proceed to block 124 and remain in sleep mode. The process 120 may thereby keep the controller 20 in a perpetual event loop that maintains the lighting device 12 in a low-power state most of the time to conserve energy.

If the sleep mode has been interrupted ("YES" branch of decision block 122), the process 120 may proceed to block 126 and wake up the lighting device 12. Waking up the lighting device 12 may include powering up at least a portion of the controller 20 or I/O interface 22 to determine if any signals 16 have been received from another device. The process 120 may also check to see if any signals are being received from the ambient sensor 26, user interface 28, or power supply 30 that would indicate an event has occurred which requires a response by the lighting device 12, such as activation of the lighting device 12 via the user interface 28.

If no signals have been received ("NO" branch of decision block 128), the process 120 may proceed to block 130, reset the sleep timer, and re-enter sleep mode. If a signal has been received ("YES" branch of decision block 128), the process 120 may proceed to block 132 and determine if the signal was received from another device, i.e., is an "external signal". If the signal is not an external signal ("NO" branch of decision block 132), the process may proceed to block 134. This may occur, for example, if the signal was received from the ambient sensor 26 or power supply 30, or due to direct activation of the lighting device 12 through the user interface 28.

If the signal is an external signal, such as a signal 16 from another device ("YES" branch of decision block 132), the process 120 may proceed to block 136 and extract data from the signal. The extracted data may include one or more identifiers, commands, parameters, settings, or any other data that may be used to manage the lighting system 10. This data may define, for example, an on-time duration for the light source 24, a duration for rebroadcasting the signal 16, threshold light levels for turning on or turning off the light source 24, a spectral content of the light to be emitted by the light source 24, an intensity of the light to be emitted by the light source 24, an alert or bonding condition, or one or more identities of lighting devices 12 that are to activate their light sources 24 in response to receiving the signal 16.

Parameters defined by the data may be used to control the response of the lighting device 12 to just the received signal 16 carrying the data, or may be used to update settings in the lighting device 12 so that they control operation of the lighting device 12 in response to receiving other signals. In cases where the signal 16 includes one or more identifiers of lighting devices 12 which are to be lit, the receiving lighting device 12 may only activate its light source 24 if its identifier matches one of these identifiers. If the identifier of the receiving lighting device 12 does not match any of the identifiers carried by the received signal 16, the lighting device 12 may ignore the signal 16, or may relay the signal 16 without activating its light source 24.

In block 138, the process 120 may determine if the signal 16 was received from an authorized device. This determination may be made, for example, by comparing one or more identifiers carried by the signal 16 to a list of authorized devices, e.g., devices included in the lighting system 10. Devices included in the lighting system 10 may include all devices that have been bonded to the lighting device 12, or may be defined by a list of devices selected by the user through interaction with the communication device 14. If the signal 16 was not received from an authorized device ("NO" branch of decision block 138), the process 120 may proceed to block 130, reset the sleep timer, and enter sleep mode. If the signal 16 was received from an authorized device ("YES" branch of decision block 138), the process 120 may proceed to block 134.

In block 134, the process 120 may set a light timer and transmit a signal 16 configured to activate any lighting devices 12 to which the present lighting device 12 is bonded or otherwise authorized to communicate. The transmitted signal 16 may include identifiers for one or more of the originating device, transmitting device, and any relaying devices.

The process 120 may proceed to block 140 and determine if the ambient light level is below the threshold light level. If the ambient light is not below the threshold light level ("NO" branch of decision block 140), the process 120 may proceed to block 144. Thus, if the ambient light level is above the threshold light level, the lighting device 12 may conserve energy by not activating the light source 24. If the ambient light is below the threshold light level ("YES" branch of decision block 140), the process 120 may proceed to block 142 and activate the light source 24 before proceeding to block 144. The process 120 may thereby cause the lighting device 12 to activate the light source 24 if a photocell of the ambient sensor 26 or energy source 32 indicates that the lighting device 12 is in a dark environment.

When activating the light source 24, the process 120 may also adjust the threshold light level to provide hysteresis. This hysteresis may prevent the light source 24 from being repeatedly turned on and off when the ambient light level is close to the initial threshold light level. In an alternative embodiment of the invention, the process 120 may avoid strobing by ignoring or adjusting ambient light level readings while the light source 24 is active.

In block 144, the process 120 may determine if the lighting device 12 has received a new signal from an authorized source. For example, another or duplicate signal that would cause the lighting device 12 to activate its light source 24 if it was not already activated. If a new authorized signal has been received ("YES" branch of decision block 144), the process 120 may return to block 134 to reset the light timer and transmit another signal 16. If a new authorized signal has not been received ("NO" branch of decision block 144), the process 120 may proceed to block 146 and determine if the light timer has expired. If the light timer has not expired ("NO" branch of decision block 146), the process 120 may proceed to block 144. Thus, the process 120 may remain in a light timer loop in which the light timer is reset each time an authorized activation signal is received by the lighting device 12. If the light timer has expired ("YES" branch of decision block 146), the process 120 may proceed to block 148 and deactivate the light source 24. The process may then proceed to block 130, reset the sleep timer, and enter sleep mode.

Figure 8:
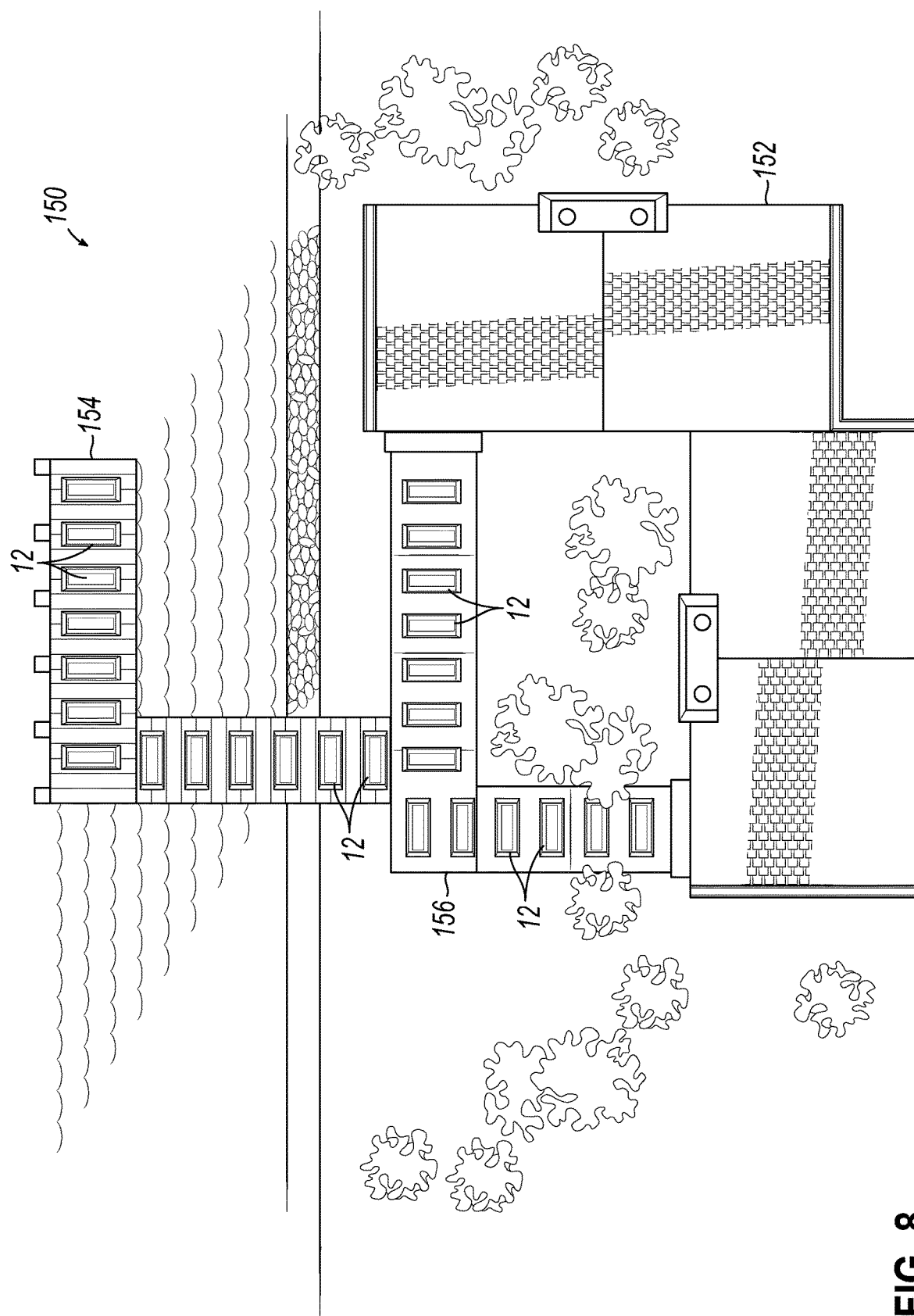
FIG. 8 is a diagrammatic view of an exemplary operating environment for the lighting system of FIG. 1.

FIG. 8 depicts an exemplary operating environment 150 for the present invention that includes a house 152 connected to a boat dock 154 by a path 156. A plurality of lighting devices 12 are placed at intervals along the path 156. A person traveling from the house 152 to the boat dock 154, or exiting a boat at the boat dock 154, may step on one of the lighting devices 12 proximate to the point at which they step on the boat dock 154 or enter the path 156. In response to sensing the pressure provided by the person stepping on the lighting device 12, the lighting device 12 may begin emitting light and may also transmit signals 16 that are received by one or more of the other lighting devices 12. In response to receiving these signals 16, the other lighting devices 12 may also begin to emit light and transmit signals 16. This may result in all or a predefined portion of the lighting devices 12 emitting light that illuminates the path 156. The lighting devices 12 may thereby facilitate the person traversing the path between the house 152 and boat dock 154.

Figure 9:
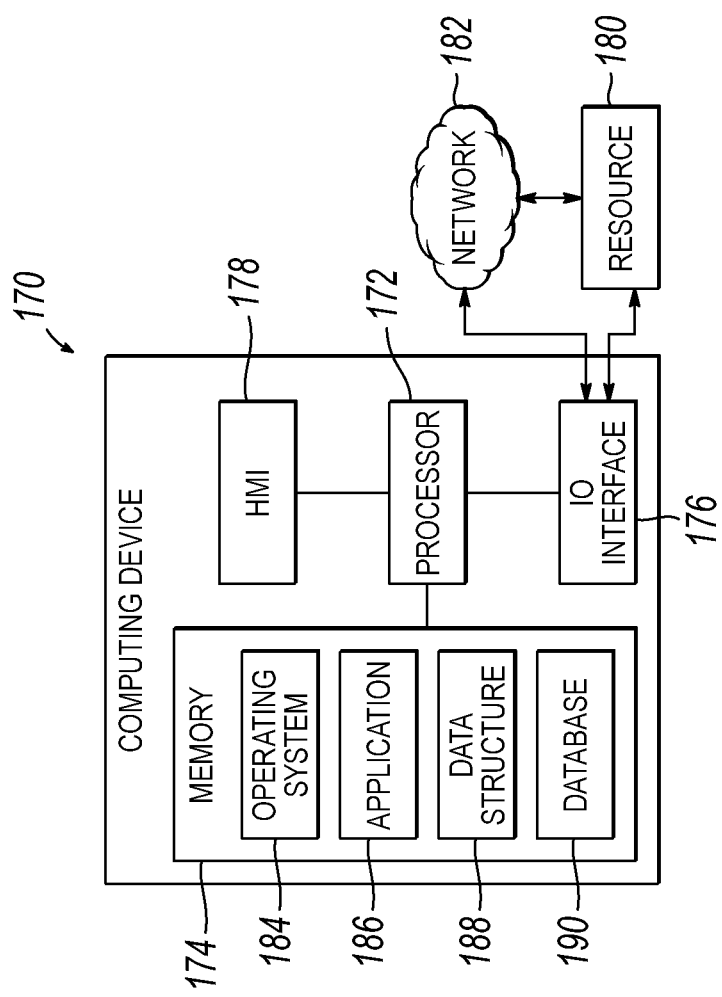
FIG. 9 is a diagrammatic view of a computer that may be used to implement one or more of the components or processes shown in FIGS. 1-8.

Referring now to FIG. 9, embodiments of the invention described above, or portions thereof, may be implemented using one or more computer devices or systems, such as exemplary computer 170. The computer 170 may include a processor 172, a memory 174, an input/output (I/O) interface 176, and a Human Machine Interface (HMI) 178. The computer 170 may also be operatively coupled to one or more external resources 180 via the network 182 or I/O interface 176. External resources may include, but are not limited to, servers, databases, mass storage devices, peripheral devices, cloud-based network services, or any other resource that may be used by the computer 170.

The processor 172 may include one or more devices selected from microprocessors, micro-controllers, digital signal processors, microcomputers, central processing units, field programmable gate arrays, programmable logic devices, state machines, logic circuits, analog circuits, digital circuits, or any other devices that manipulate signals (analog or digital) based on operational instructions that are stored in memory 174. Memory 174 may include a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or data storage devices such as a hard drive, optical drive, tape drive, volatile or non-volatile solid state device, or any other device capable of storing data.

The processor 172 may operate under the control of an operating system 184 that resides in memory 174. The operating system 184 may manage computer resources so that computer program code embodied as one or more computer software applications, such as an application 186 residing in memory 174, may have instructions executed by the processor 172. In an alternative embodiment, the processor 172 may execute the application 186 directly, in which case the operating system 184 may be omitted. One or more data structures 188 may also reside in memory 174, and may be used by the processor 172, operating system 184, or application 186 to store or manipulate data.

The I/O interface 176 may provide a machine interface that operatively couples the processor 172 to other devices and systems, such as the external resource 180 or the network 182. The application 186 may thereby work cooperatively with the external resource 180 or network 182 by communicating via the I/O interface 176 to provide the various features, functions, applications, processes, or modules comprising embodiments of the invention. The application 186 may also have program code that is executed by one or more external resources 180, or otherwise rely on functions or signals provided by other system or network components external to the computer 170. Indeed, given the nearly endless hardware and software configurations possible, persons having ordinary skill in the art will understand that embodiments of the invention may include applications that are located externally to the computer 170, distributed among multiple computers or other external resources 180, or provided by computing resources (hardware and software) that are provided as a service over the network 182, such as a cloud computing service.

The HMI 178 may be operatively coupled to the processor 172 of computer 170 to allow a user to interact directly with the computer 170. The HMI 178 may include video or alphanumeric displays, a touch screen, a speaker, and any other suitable audio and visual indicators capable of providing data to the user. The HMI 178 may also include input devices and controls such as an alphanumeric keyboard, a pointing device, keypads, pushbuttons, control knobs, microphones, etc., capable of accepting commands or input from the user and transmitting the entered input to the processor 172.

A database 190 may reside in memory 174, and may be used to collect and organize data used by the various systems and modules described herein. The database 190 may include data and supporting data structures that store and organize the data. In particular, the database 190 may be arranged with any database organization or structure including, but not limited to, a relational database, a hierarchical database, a network database, or combinations thereof. A database management system in the form of a computer software application executing as instructions on the processor 172 may be used to access the information or data stored in records of the database 190 in response to a query, which may be dynamically determined and executed by the operating system 184, other applications 186, or one or more modules.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations or elements embodying the various aspects of the embodiments of the invention. Computer-readable program instructions for carrying out operations of the embodiments of the invention may be, for example, assembly language, source code, or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a computer program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, or operations specified in the flow-charts, sequence diagrams, or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, or operations specified in the flow-charts, sequence diagrams, or block diagrams.

In certain alternative embodiments, the functions, acts, or operations specified in the flow-charts, sequence diagrams, or block diagrams may be re-ordered, processed serially, or processed concurrently consistent with embodiments of the invention. Moreover, any of the flow-charts, sequence diagrams, or block diagrams may include more or fewer blocks than those illustrated consistent with embodiments of the invention.

It should be understood that the elements or features depicted by the drawings are not necessarily to scale within each drawing or between drawings. The drawings may also emphasize, deemphasize, or omit certain elements in order to more clearly illustrate embodiments of the invention and to help convey a clear understanding thereof.

The terminology used herein is for the purpose of describing particular embodiments only and is not intended to be limiting of the embodiments of the invention. As used herein, the singular forms "a", "an" and "the" are intended to include both the singular and plural forms, and the terms "and" and "or" are each intended to include both alternative and conjunctive combinations, unless the context clearly indicates otherwise. It will be further understood that the terms "comprises" or "comprising," when used in this specification, specify the presence of stated features, integers, actions, steps, operations, elements, or components, but do not preclude the presence or addition of one or more other features, integers, actions, steps, operations, elements, components, or groups thereof. Furthermore, to the extent that the terms "includes", "having", "has", "with", "comprised of", or variants thereof are used in either the detailed description or the claims, such terms are intended to be inclusive in a manner similar to the term "comprising".

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A system, comprising:
    a first lighting device comprising:
        a first housing;
        a first processor, a first memory including first program code, and a first transceiver supported by the first housing,
        the first housing including a first recessed portion and a second recessed portion, the first lighting device further comprising:
        a first solar panel including one or more photovoltaic or photoelectric cells supported in the first recessed portion of the first housing;
        a first lens having a top surface, a bottom surface and at least one side surface extending between the top and bottom surfaces, the first lens being positioned to overlie the first solar panel;
        a first light source comprising one or more light emitting diodes (LEDs) positioned relative to the first recessed portion to transmit light emitted by the first light source to be incident on the at least one side surface of the first lens and be transmitted outward from the top surface of the first lens; and
        a first cover made of optically translucent or transparent material supported in the second recessed portion of the first housing and being positioned to overlie the first lens;
    a second lighting device comprising:
        a second housing;
        a second processor, a second memory including second program code, and a second transceiver supported by the second housing,
        the second housing including a first recessed portion and a second recessed portion, the second lighting device further comprising:
        a second solar panel including one or more photovoltaic or photoelectric cells supported in the first recessed portion of the second housing;
        a second lens having a top surface, a bottom surface and at least one side surface extending between the top and bottom surfaces, the second lens being positioned to overlie the second solar panel;
        a second light source comprising one or more light emitting diodes (LEDs) positioned relative to the first recessed portion of the second housing to transmit light emitted by the second light source to be incident on the at least one side surface of the second lens and be transmitted outward from the top surface of the second lens; and
        a second cover made of optically translucent or transparent material supported in the second recessed portion of the second housing and being positioned to overlie the second lens;
wherein the first program code, when executed by the first processor, causes the first lighting device to:
receive a first signal, and
in response to receiving the first signal, activate the first light source and transmit a second signal, and
wherein the second program code, when executed by the second processor, causes the second lighting device to:
receive the second signal, and
in response to receiving the second signal, activate the second light source.

2. The system of claim 1, wherein the first program code further causes the first lighting device to:
extract data from the first signal indicative of an identity of a transmitting device;
compare the identity of the transmitting device to a list of authorized devices; and
only activate the first light source or transmit the second signal if the transmitting device is an authorized device.

3. The system of claim 2, wherein the first program code further causes the first lighting device to:
in response to the transmitting device not being an authorized device, enter a sleep mode.

4. The system of claim 2, wherein the list of authorized devices defines a group of lighting devices that are all illuminated when any one of the lighting devices in the group are activated.

5. The system of claim 1, wherein the first program code further causes the first lighting device to:
extract data from the first signal indicative of a characteristic of light to be emitted by the first light source; and
cause the first light source to emit light having the characteristic.

6. The system of claim 1, wherein the first program code further causes the first lighting device to:
determine an ambient light level;
compare the ambient light level to a threshold light level; and
only activate the first light source if the ambient light level is less than the threshold light level.

7. The system of claim 1, wherein the first program code further causes the first lighting device to:
in response to receiving the first signal, set a light timer; and
in response to the light timer expiring, deactivate the first light source.

8. The system of claim 7, wherein the first program code further causes the first lighting device to:
receive a third signal; and
in response to receiving the third signal, reset the light timer.

9. The system of claim 1, wherein:
the first light source includes a first identifier,
the first signal includes one or more identifiers that identify lighting devices that are to activate their respective light sources, and
the first program code only causes the first lighting device to activate the first light source if the first identifier is one of the one or more identifiers included in the first signal.

10. The system of claim 1,
wherein the first and second light sources are positioned in the respective first recessed portions of the first and second housings.

11. The system of claim 1,
wherein the respective first and second light sources are positioned in at least one edge of the respective first recessed portions of the first and second housings.

12. The system of claim 1,
wherein each of the first and second lighting devices further comprises:
at least one pressure sensor positioned and configured to support the respective first and second covers.

13. The system of claim 1,
wherein each of the first and second lighting devices comprises:
an ambient sensor responsive to at least one of an ambient light level, a sound level, movement, temperature, an image or video of an area in view of the respective first and second lighting devices, and/or a transducer.

14. The system of claim 1,
wherein each of the first and second lighting devices comprises:
a user interface including at least one of a touch sensor, a pressure sensor, a switch, a proximity sensor, a motion sensor, a microphone, a data port, and/or a speaker.

15. A method comprising:
receiving a first signal at a first lighting device, the first lighting device comprising:
a first housing;
a first processor, a first memory including first program code, and a first transceiver supported by the first housing,
the first housing including a first recessed portion and a second recessed portion, the first lighting device further comprising:
a first solar panel including one or more photovoltaic or photoelectric cells supported in the first recessed portion of the first housing;
a first lens having a top surface, a bottom surface and at least one side surface extending between the top and bottom surfaces, the first lens being positioned to overlie the first solar panel;
a first light source comprising one or more light emitting diodes (LEDs) positioned relative to the first recessed portion to transmit light emitted by the first light source to be incident on the at least one side surface of the first lens and be transmitted outward from the top surface of the first lens or first cover; and
a first cover made of optically translucent or transparent material supported in the second recessed portion of the first housing and being positioned to overlie the first lens;
in response to receiving the first signal, the first lighting device activating the first light source and transmitting a second signal;
receiving the second signal at a second lighting device, the second lighting device comprising:
a second housing;
a second processor, a second memory including second program code, and a second transceiver supported by the second housing,
the second housing including a first recessed portion and a second recessed portion, the second lighting device further comprising:
a second solar panel including one or more photovoltaic or photoelectric cells supported in the first recessed portion of the second housing;

a second lens having a top surface, a bottom surface and at least one side surface extending between the top and bottom surfaces, the second lens being positioned to overlie the second solar panel;

a second light source comprising one or more light emitting diodes (LEDs) positioned relative to the first recessed portion of the second housing to transmit light emitted by the second light source to be incident on the at least one side surface of the second lens and be transmitted outward from the top surface of the second lens; and a second cover made of optically translucent or transparent material supported in the second recessed portion of the second housing and being positioned to overlie the second lens; and in response to receiving the second signal, the second lighting device activating the second light source.

16. The method of claim 15, further comprising:
extracting data from the first signal indicative of an identity of a transmitting device;
comparing the identity of the transmitting device to a list of authorized devices; and
only activating the first light source or transmitting the second signal if the transmitting device is an authorized device.

17. The method of claim 16, further comprising:
in response to the transmitting device not being an authorized device, causing the first lighting device to enter a sleep mode.

18. The method of claim 16, wherein the list of authorized devices defines a group of lighting devices that are all illuminated when any one of the lighting devices in the group are activated.

19. The method claim 15, further comprising:
extracting data from the first signal indicative of a characteristic of light to be emitted by the first light source; and
causing the first light source to emit light having the characteristic.

20. The method of claim 15, further comprising:
determining an ambient light level at the first lighting device;
comparing the ambient light level to a threshold light level; and
only activating the first light source if the ambient light level is less than the threshold light level.

21. The method of claim 15, further comprising:
in response to receiving the first signal, setting a light timer; and
in response to the light timer expiring, deactivating the first light source.

22. The method of claim 21, further comprising:
receiving a third signal at the first lighting device; and
in response to receiving the third signal, resetting the light timer.

23. The method of claim 15, wherein:
the first light source includes a first identifier,
the first signal includes one or more identifiers that identify lighting devices that are to activate their respective light sources, and
only activating the first light source if the first identifier is one of the one or more identifiers included in the first signal.

24. The method of claim 15, wherein the first signal is received from a user interface of the first lighting device or as a wireless signal transmitted from a device external to the first lighting device.

25. A computer program product comprising:
a non-transitory computer-readable storage medium; and
program code stored on the non-transitory computer-readable storage medium that, when executed by one or more processors, causes the one or more processors to:
receive a first signal at a first lighting device, the first lighting device comprising:
a first housing;
a first processor, a first memory including first program code, and a first transceiver supported by the first housing,
the first housing including a first recessed portion and a second recessed portion, the first lighting device further comprising:
a first solar panel including one or more photovoltaic or photoelectric cells supported in the first recessed portion of the first housing;
a first lens having a top surface, and a bottom surface and at least one side surface extending between the top and bottom surfaces, the first lens being positioned to overlie the first solar panel;
a first light source comprising one or more light emitting diodes (LEDs) positioned relative to the first recessed portion to transmit light emitted by the first light source to be incident on the at least one side surface of the first lens and be transmitted outward from the top surface of the first lens; and
a first cover made of optically translucent or transparent material supported in the second recessed portion of the first housing and being positioned to overlie the first lens;
in response to receiving the first signal, activate the first light source and transmit a second signal from the first lighting device;
receive the second signal at a second lighting device, the second lighting device comprising:
a second housing;
a second processor, a second memory including second program code, and a second transceiver supported by the second housing,
the second housing including a first recessed portion and a second recessed portion, the second lighting device further comprising:
a second solar panel including one or more photovoltaic or photoelectric cells supported in the first recessed portion of the second housing;
a second lens having a top surface, a bottom surface and at least one side surface extending between the top and bottom surfaces, the second lens being positioned to overlie the second solar panel;
a second light source comprising one or more light emitting diodes (LEDs) positioned relative to the first recessed portion of the second housing to transmit light emitted by the second light source to be incident on the at least one side surface of the second lens and be transmitted outward from the top surface of the second lens; and
a second cover made of optically translucent or transparent material supported in the second recessed portion of the second housing and being positioned to overlie the second lens; and
in response to receiving the second signal, activate the second light source.

* * * * *

UNITED STATES PATENT AND TRADEMARK OFFICE
CERTIFICATE OF CORRECTION

| | |
|---|---|
| PATENT NO. | : 11,632,848 B2 |
| APPLICATION NO. | : 16/891609 |
| DATED | : April 18, 2023 |
| INVENTOR(S) | : Charles D. Pauly et al. |

It is certified that error appears in the above-identified patent and that said Letters Patent is hereby corrected as shown below:

In the Claims

In Claim 4, Column 17, Lines 28-29, change "illuminated when any one of the lighting devices in the group are activated." to --illuminated when any one of the lighting devices in the group is activated.--.

In Claim 15, Column 18, Line 47, change "from the top surface of the first lens or first cover;" to --from the top surface of the first lens;--.

In Claim 15, Column 18, Lines 51-52, change "the first housing and being positioned to overlie the first lens:" to --the first housing and being positioned to overlie the first lens;--.

In Claim 18, Column 19, Lines 32-33, change "illuminated when any one of the lighting devices in the group are activated." to --illuminated when any one of the lighting devices in the group is activated.--.

Signed and Sealed this
Thirteenth Day of June, 2023

Katherine Kelly Vidal
*Director of the United States Patent and Trademark Office*